United States Patent
Lowe et al.

(10) Patent No.: US 11,225,754 B2
(45) Date of Patent: Jan. 18, 2022

(54) ELECTROCHEMICAL GRAFTING OF CARBON FIBERS WITH ALIPHATIC AMINES FOR IMPROVED COMPOSITE STRENGTH

(71) Applicant: Dow Global Technologies LLC, Midland, MI (US)

(72) Inventors: Michael A. Lowe, Midland, MI (US); Richard Baumer, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 159 days.

(21) Appl. No.: 16/604,595

(22) PCT Filed: Apr. 11, 2018

(86) PCT No.: PCT/US2018/027069
§ 371 (c)(1),
(2) Date: Oct. 11, 2019

(87) PCT Pub. No.: WO2018/217321
PCT Pub. Date: Nov. 29, 2018

(65) Prior Publication Data
US 2020/0378059 A1   Dec. 3, 2020

Related U.S. Application Data

(60) Provisional application No. 62/511,523, filed on May 26, 2017.

(51) Int. Cl.
*D06M 13/328* (2006.01)
*C08J 5/06* (2006.01)
(Continued)

(52) U.S. Cl.
CPC ............. *D06M 13/328* (2013.01); *C08J 5/06* (2013.01); *D06M 10/08* (2013.01);
(Continued)

(58) Field of Classification Search
CPC ......... Y10T 428/2918; Y10T 428/2931; Y10T 428/31504; Y10T 428/31511;
(Continued)

(56) References Cited

U.S. PATENT DOCUMENTS 3,313,747 A   4/1967   Shramm
3,832,297 A   8/1974   Paul, Jr.
(Continued)

FOREIGN PATENT DOCUMENTS

CN   102660866   9/2012
EP   0308664   3/1989
(Continued)

OTHER PUBLICATIONS

Fitzer, E., et al., "Effect of Surface Treatment and Sizing of C-Fibers on the Mechanical Properties of CFR Thermosetting and Thermoplastic Polymers," Carbon, 1987, p. 455-467, vol. 25, No. 4.
(Continued)

*Primary Examiner* — Camie S Thompson

(57) ABSTRACT

The surface of a carbon fiber is electrochemically treated by a method to form nitrogen containing groups on the surface of the carbon fiber. The method comprises contacting a carbon fiber surface with an aqueous solution comprised of a non-cyclic aliphatic amine and water soluble inorganic hydroxide with said aqueous solution having a pH of at least 9. A positive electrical bias is then applied to the carbon fibers in the aqueous solution relative to another electrode in contact with the aqueous solution, wherein the positive electrical bias is at a voltage above the oxidation potential of water. The treated carbon fibers are useful for making epoxy reinforced carbon fiber composites.

15 Claims, 1 Drawing Sheet

(51) Int. Cl.
  *D06M 10/08* (2006.01)
  *D06M 15/643* (2006.01)
  *D06M 101/40* (2006.01)

(52) U.S. Cl.
  CPC ...... *D06M 15/6436* (2013.01); *C08J 2363/00* (2013.01); *D06M 2101/40* (2013.01)

(58) Field of Classification Search
  CPC .. D06M 210/40; D06M 14/36; D06M 13/325; D06M 15/6436; C08L 9/02; C08J 2363/00; C08J 5/06; C09K 9/02; D01F 11/122; D01F 9/12
  USPC ...... 205/674, 768; 428/411.1, 367, 374, 413
  See application file for complete search history.

(56) References Cited

U.S. PATENT DOCUMENTS

| | | |
|---|---|---|
| 3,859,187 A | 1/1975 | Druin et al. |
| 4,066,628 A | 1/1978 | Ashida et al. |
| 4,401,533 A | 8/1983 | Saito et al. |
| 4,637,925 A | 1/1987 | Hiramatsu et al. |
| 4,690,738 A | 9/1987 | Desarmot et al. |
| 4,704,196 A | 11/1987 | Saito et al. |
| 4,742,146 A | 5/1988 | Hefner, Jr. |
| 4,839,006 A | 6/1989 | Nakao et al. |
| 4,844,781 A | 7/1989 | Sanchez et al. |
| 5,278,257 A | 1/1994 | Mulhaupt et al. |
| 5,589,055 A | 12/1996 | Kobayashi et al. |
| 5,691,055 A | 11/1997 | Kobayashi et al. |
| 6,214,201 B1 | 4/2001 | Park et al. |
| 8,309,644 B1 | 11/2012 | Huang |
| 2010/0266827 A1 | 10/2010 | Oyama et al. |

FOREIGN PATENT DOCUMENTS

| | | |
|---|---|---|
| EP | 251491 B1 | 7/1992 |
| EP | 1632533 B1 | 4/2013 |
| FR | 2607528 | 6/1988 |
| GB | 2159178 | 11/1985 |
| JP | 3287860 | 12/1991 |
| JP | 4281067 | 10/1992 |
| JP | 2002105850 | 4/2002 |
| WO | 2002070148 | 9/2002 |
| WO | 2017066056 | 4/2017 |

OTHER PUBLICATIONS

Downard, Alison J., "Electrochemically Assisted Covalent Modification of Carbon Electrodes," Electroanalysis, 2000, p. 1085-1096, vol. 12, No. 14.

Feier, Bogdan, et al., "Influence of the electrografting method on the performances of a flow electrochemical sensor using modified electrodes for trace analysis of copper (II)", Journal of Electroanalytical Chemistry, 2015. p. 1-7, vol. 744.

Geneste, Florence, et al., "Electrochemically linking TEMPO to carbon via amine bridges", New Journal of Chemistry, 2005, p. 269-271, vol. 29.

Ghilane, Jalal, et al., "Oxidative and Stepwise Grafting of Dopamine Inner-Sphere Redox Couple onto Electrode Material: Electron Transfer Activation of Dopamine", Analytical Chemistry, 2013, p. 11593-11601, vol. 85.

Kim, Tae Hyun, et al., "Modification of a glassy carbon surface with amine-terminated dendrimers and its application to electrocatalytic hydrazine oxidation", Electrochemistry Communications, 2010, p. 788-791, vol. 12.

Peng, Jimmy C., et al., "Immobilization of Amines at Carbon Fiber Surfaces: Relevance to Adhesion In Carbon Fiber-Epoxy Composite Materials," Department of Chemistry—University of Wyoming, 1995, p. 1-15, Langmuir.

Buttry, Daniel A., et. al., "Immobilization of amines at carbon fiber surfaces", Carbon, 1999, p. 1929-1940. vol. 37.

Lee, H. E., et al., Handbook of Epoxy Resins,1967, McGraw-Hill, New York.

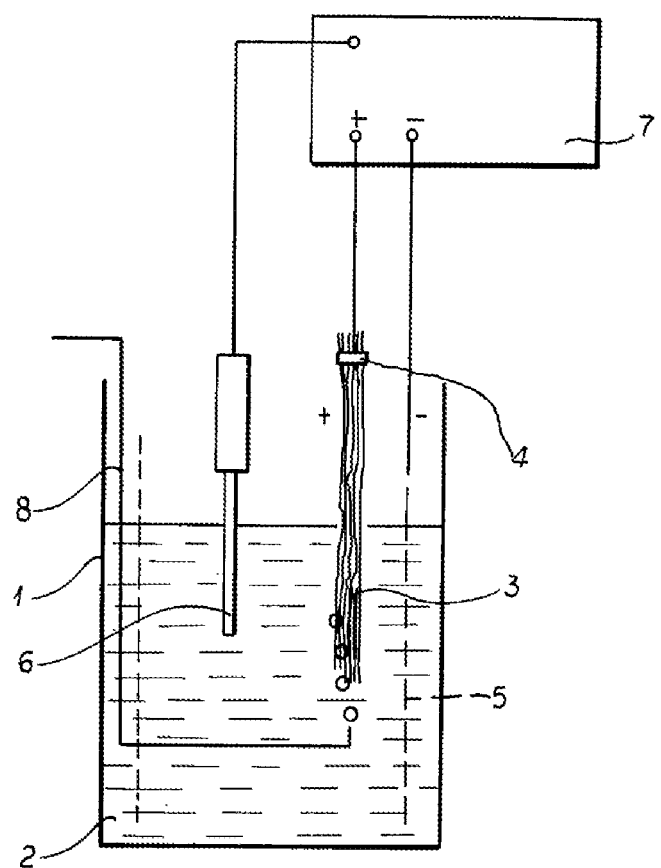

ELECTROCHEMICAL GRAFTING OF CARBON FIBERS WITH ALIPHATIC AMINES FOR IMPROVED COMPOSITE STRENGTH

FIELD OF THE INVENTION

The invention relates to a method of electrochemically surface treating carbon fibers. In particular, the invention is directed to aqueous electrochemical treatment of carbon fibers in the presence of aliphatic amines and their use in forming fiber reinforced composites.

BACKGROUND

Fiber reinforced composites typically comprise a resin matrix that is reinforced with fibers, such as carbon fibers. The matrix resin is commonly an epoxy resin. The fiber reinforced composites are typically prepared in a process in which a fabric or tow comprising fibers is impregnated with the resin to form a so called prepreg. Prepreg is commonly used to describe a reinforced composite comprising fibers that are impregnated with a resin that is in an uncured or partially cured state. The prepreg can then be molded into a final or semifinal molded part by subjecting the prepreg to conditions that cure the resin. Typically, heating is used to cure the prepreg in a mold at a temperature for a time sufficient to cure the resin.

When such composites are subject to shear stresses, loss of cohesion may result causing separation of the layers and unexpected premature failure of the composite. The higher the shear stress at which delamination occurs the higher the stress level prior to failure will be. However, excessive adhesion tends to lead to a more brittle fracture of the material, which may not be desirable, for example, in applications which may be subject to impact such as automotive body parts.

The adhesion of the carbon fibers to epoxy resins have been improved by oxidizing the carbon fiber surface electrochemically in aqueous solutions. Such oxidation increases the surface area and presence of oxygen species on the surface of the carbon fiber (*Carbon*, 25 (1987) 455-467). Unfortunately, such oxidation also tends to cause the fiber tensile strength to decrease causing the fiber composite to have reduced impact strength or toughness in bending or tension.

Forming other chemical species on the carbon fiber while minimizing the degradation that oxidation causes has generally been performed by electrochemically oxidation of amines in aprotic solvents (e.g., U.S. Pat. No. 4,844,781). The use of more oxidative stable aprotic solvents has been reported as being necessary to oxidize primary amines when functionalizing carbon fibers with amino groups. Ibid. The use of such solvents unfortunately tend to be high cost and inherently present environmental health and safety issues. Because of the low oxidation potential of water that is almost invariably lower than amines and amides, it has not been employed to provide amino functionalizing carbon fibers.

Amino functionalizing of carbon fibers has been described by U.S. Pat. No. 4,690,738. This patent describes aqueous electrochemical functionalizing of carbon fibers in amine or amide (e.g., hexamethylenetetramine, 6-amino-2-methylpyridine, urea, and isopropylamine) containing aqueous solutions. To prevent oxidation of the carbon fiber, argon is bubbled through the aqueous solution around the fibers and the voltage is held below where the water oxidizes resulting in slow functionalization.

Accordingly, there still exists a need for improved methods for functionalizing carbon fiber surfaces with amino groups without undue oxidation, use of organic solvents and slow functionalization.

SUMMARY

An object of the invention is to provide an improved method of improving the adhesion of carbon fibers with epoxy resins in a composite by grafting non-oxygenated groups (nitrogen bearing groups) to the surface of the carbon fibers instead of oxygenated groups.

A first aspect the invention is method of treating the surface a carbon fiber comprising;
  (i) contacting a carbon fiber surface with an aqueous solution comprised of a non-cyclic aliphatic amine and water soluble inorganic hydroxide and said aqueous solution having a pH of at least 9.
  (ii) applying a positive electrical bias to the carbon fibers in the aqueous solution relative to another electrode in contact with the aqueous solution, wherein the positive electrical bias is a voltage above the oxidation potential of water.

It has been discovered that the use of low concentrations of an aliphatic amine in an aqueous solution having a high pH allows the rapid and efficient functionalizing of carbon fibers with nitrogen containing groups without undue oxidation of the carbon fibers. It is not understood why this may be so, but without limiting the invention in any way, it may be due the stability of the aliphatic amine to polymerization or reactivity compared to other amines such as cyclic amines, aromatic amines or alcohol amines A second aspect of the invention is a carbon fiber treated by the method of the first aspect.

A third aspect of the invention is an epoxy fiber reinforced composite comprising a cured epoxy resin matrix having therein carbon fibers of the second aspect, wherein the carbon fibers comprise greater than 50% by volume of said composite.

BRIEF DESCRIPTION OF THE DRAWING

FIG. 1 is a diagram of representative apparatus for performing the method of the invention.

DETAILED DESCRIPTION

The method for treating the surface of a carbon fiber comprises contacting a carbon fiber surface with an aqueous solution comprised of a non-cyclic aliphatic amine and water soluble inorganic hydroxide and said aqueous solution having a pH of at least 9. Illustratively, in the experimental apparatus shown diagrammatically in FIG. 1, a tank 1 contains an aqueous solution of electrolyte 2 in which a bundle of carbon fibers 3 is immersed (contacted). The carbon fibers constitute an anode and are wrapped around a plastic mesh 4 (partially shown). The anode, together with a graphite cathode 5 and a saturated Ag/AgCl reference electrode 6 are also immersed in the solution 2 are connected to a voltage source 7 which can provide a variable or constant voltage or constant current. The apparatus may also contain a gas bubbling means 8, such as a tube connected to a gas source not pictured for bubbling an external gas through the bundle of carbon fibers 3. In another embodiment, the fibers may be continuously fed through a bath of the aqueous solution while applying the voltage where the residence time corresponds to the batch times described herein.

The aqueous solution (herein "electrolyte") is comprised of a non-cyclic aliphatic amine and a water soluble inorganic hydroxide. The non-cyclic aliphatic amine ("amine") is an amine that may have one or more ether linkages or carbons replaced with a silicon atom. The amine may be linear or branched. The amine may have one or more amino groups with an upper practical limit being on the order of about 10 amine groups. The amino group or groups present in the amine may be primary, secondary, tertiary amines or combination thereof. Preferably, the amine has at least one primary amine and desirably all of the amine groups are primary amines Preferably, the amine may be represented by:

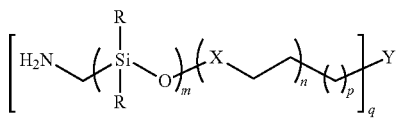

wherein X is C, N, or O, Y is C or N, m is 0 to 200, n is 0 to 200, p is 0 to 10 and q is 1 to 3. Exemplary amines include hexamethylenediamine, 2,2'-ethylenedioxy-bis(ethylamine), diethylenetriamine, triethylenetetramine, or combination thereof.

The inorganic hydroxide is any inorganic hydroxide that is soluble in water at the concentrations employed. Typically the inorganic hydroxide is potassium hydroxide or sodium hydroxide or combination thereof. Preferably the inorganic hydroxide is sodium hydroxide.

The carbon fibers may be any useful to make epoxy reinforced fiber composites. Exemplary carbon fibers include Aksaca 3K A-38, 6K A-38, 12K A-42, 24K A-42, 12 K A-49 and 24 K A-49 carbon fibers available from Dow Aksa Ileri Kompozit Malzemeler Saai Ltd, Sti, Istanbul, Turkey. These product designations indicate the approximate number of filaments/roving in thousands (3K being 3,000 filaments, for example), and the approximate tensile strength of the fibers in hundreds of MPa (A-38 indicating a tensile strength of 3,800 MPa).

Typically, the carbon fibers are arranged in tows. The "tows" (sometimes referred to as "rovings" or simply 'fibers") are multifilament fibers. The number of filaments per tow may be, for example, 100 to 30,000. The tows should be thermally and chemically stable under conditions of prepreg formation (e.g., curing of the epoxy resin composition).

The fibers may have any cross-sectional shape including any polygon, circular or shape made up of continuous arcs (e.g., kidney bean like shape). Typically the fibers will have a circular or almost circular cross-section with a diameter in the range of from 0.5 to 30 microns, preferably from 2 to 20 microns, and more preferably, from 2 to 15 microns. In terms of weight, the individual tows may have a weight of, for example, 200 to 3,000 g/1000 meters, 600 to 2,000 g/1000 meters, or 750 to 1750 g/1000 meters.

The fibers may be present in a textile that is unidirectional, bidirectional or multidirectional depending on the desired properties required in the final fiber reinforced composite. The fibrous material may be in the form of tows or fabrics and may be in the form of random, knitted, non-woven, multi-axial (e.g., non-crimped fabric or mats), braided or any other suitable pattern.

The amine may be present in the electrolyte at any concentration capable of surface treating the carbon fibers. Generally, the concentration of the amine is from 0.1 millimolar (mM) to about 500 mM. Preferably, the amine is present at a concentration of at least 1, 5, 10 or 15 mM to 100, 50, 30 or 25 mM. The inorganic hydroxide may be present in the electrolyte to realize the desired pH of the electrolyte. Typically, the inorganic hydroxide is present in a concentration of 10 mM to 1 M. Desirably, the concentration of the inorganic hydroxide is 20 mM, 50 mM, or 75 mM to 500 mM, 250 mM, or 150 mM. The electrolyte has a pH of at least 9 and preferably the pH is greater than or equal to 10, 11, 12 or 13. If desired, other additives may added to the electrolyte such as a buffer which may be a carbonate or the like.

Once the carbon fiber has been contacted with the electrolyte, a positive electrical bias (voltage where the carbon fibers are the anode in the electrolyte) is applied to the carbon fibers. The voltage supplied is a voltage that, is at least some portion of the time during the applying of the electrical bias, oxidizes the water of the electrolyte and typically is less than a voltage where the amine oxidizes. Typically, the voltage is at least 0.6 volts to about 1.5 volts or 1.3 or 1.2 volts referenced to a saturated Ag/AgCl reference electrode. Typically the voltage is above the potential to oxidize the water the entire time the voltage is applied discounting any transients upon initial or ending of the voltage application. It has been discovered the present invention allows for the functionalizing to be performed using a constant current which is highly desirable, because it allows for the functionalizing of the fibers in a commercial setting without the necessity of using a reference electrode to control the voltage output. That is, the method is robust once the initial parameters are determined and are not limited by the oxidation of the water.

The applying of voltage typically is for as short a practical time to obtain the desired deposition of nitrogen containing groups at the surface of the carbon fibers. Surprisingly, as previously described, the application of the voltage may be for short times such 1 or 2 seconds to any practicable time, but generally is less than 5 minutes. Preferably, the times is at most 4 minutes, 200 seconds, 100 seconds or even 60 seconds.

In an embodiment where a constant current is applied to the carbon fibers, the current generally is 0.1 mA (milliamp) to 100 mA per gram of carbon fiber. Desirably, the current is 1 mA, 1.5 mA or 2 mA to 75 mA, 50 mA, 25 mA or 10 mA.

The carbon fiber produced by the invention of the present invention is particularly useful to make epoxy fiber reinforced composite comprising a cured epoxy resin matrix and said carbon fibers. In a particular embodiment the carbon fibers ("treated carbon fibers") comprise greater than 50% by volume of said composite.

In a particular embodiment of the composite, the epoxy resin composition is comprised of a solid epoxy resin that may be any known epoxy resin that facilitates the achievement of the desired properties. In a particular embodiment, the epoxy resin is one that comprises a solid epoxy resin comprising an epoxy terminated polyoxazolidone resin. Epoxy terminated polyoxazolidone resins are a reaction product formed by reacting a polyepoxide compound with a polyisocyanate compound. A representative chemical structure of such an oxazolidone is shown below in Formula I:

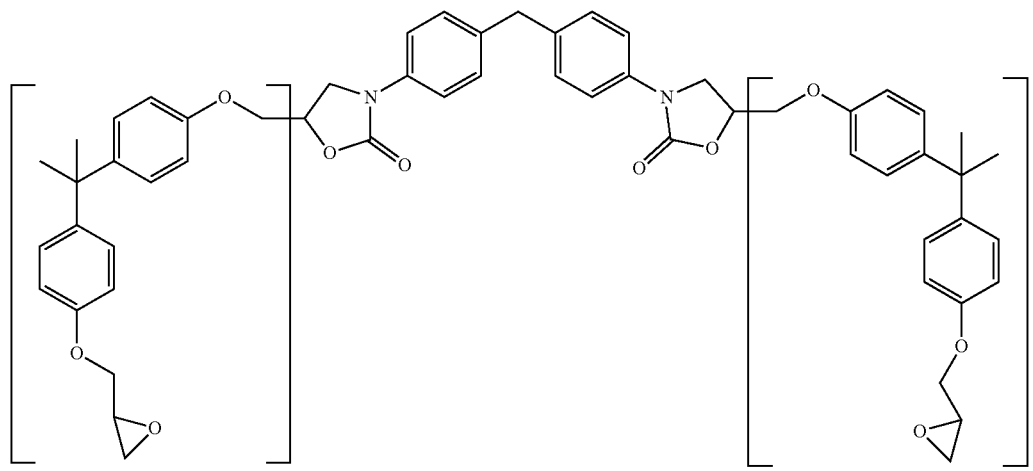

Formula I

The polyepoxide compound useful to form the epoxy resin containing oxazolidone compound possesses more than one 1,2-epoxy group. In general, the polyepoxide compound is a saturated or unsaturated aliphatic, cycloaliphatic, aromatic or heterocyclic compound which possesses more than one 1,2-epoxy group. The polyepoxide compound can be substituted with one or more substituents which are non-reactive with the isocyanate groups such as lower alkyls and halogens. Such polyepoxide compounds are well known in the art.

Illustrative polyepoxide compounds include those described in the Handbook of Epoxy Resins by H. E. Lee and K. Neville published in 1967 by McGraw-Hill, New York and U.S. Pat. No. 4,066,628, both are incorporated herein in their entireties by reference.

Particularly useful polyepoxide compounds have the following general formula

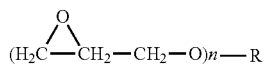

wherein R is substituted or unsubstituted aromatic, aliphatic, cycloaliphatic or heterocyclic polyvalent group and n has an average value of from greater than about 1 to less than about 5. The preferred diepoxides include diglycidyl ether of 2,2-bis(4-hydroxyphenyl) propane (generally referred to as bisphenol A) and diglycidyl ether of 2,2-bis(3,5-dibromo-4-hydroxyphenyl) propane (generally referred to as tetrabromobisphenol A) and any mixture thereof.

The polyisocyanate compound useful to form the epoxy resin containing oxazolidone may be represented by the following general formula: $(O=C=N)_m—R'$ wherein R' is a substituted or unsubstituted aliphatic, aromatic or heterocyclic polyvalent group and m has an average value of greater than about 1 to less than about 5, preferably from about 1.5 to about 4, most preferably from about 2 to about 3. Examples of suitable polyisocyanates include 4,4'-methylene bis(phenylisocyanate) (MDI) and isomers thereof, higher functional homologs of MDI (commonly designated as "polymeric MDI"), toluene diisocyanate (TDI) such as 2,4-toluene diisocyanate and 2,6-toluene diisocyanate, m-xylylene diisocyanate, hexamethylene diisocyanate (HMDI) and isophoronediisocyanate or any mixture thereof.

Other suitable polyisocyanate compounds are described in U.S. Pat. Nos. 3,313,747; 4,066,628 and 4,742,146, which are incorporated herein in their entireties by reference. Preferred polyisocyanate compounds are 4,4'-methylene bis (phenylisocyanate) (MDI) and isomers thereof, polymeric MDI and toluene diisocyanate (TDI). The most preferred polyisocyanate compounds are 4,4'-methylene bis(phenylisocyanate), isomers thereof and polymeric MDI.

A suitable catalyst is employed in the present invention to facilitate reaction of the polyepoxide compound with the polyisocyanate compound to form the aforementioned epoxy resin containing oxazolidone. Examples of suitable catalysts include zinc carboxylate, organozinc chelate compound, trialkyl aluminum, quaternary phosphonium and ammonium salts, tertiary amines and imidazole compounds. The preferred catalysts are imidazole compounds. Particularly, preferred catalysts are 2-phenylimidazole 2-methylimidazole, 1-methylimidazole, 2-ethyl-4-methylimidazole and 4,4'-methylene-bis(2-ethyl-5-methylimidazole). The catalyst is generally employed in an amount of from about 0.01 to about 2, preferably from about 0.02 to about 1, most preferably from about 0.02 to about 0.1, weight percent based on the combined weight of the polyepoxide compound and polyisocyanate compound used.

Examples of suitable epoxy resins containing an oxazolidone are available from Olin Corporation under product names D.E.R.™ 6508 or D.E.R.™ 6510.

A wide range of epoxy resins may be suitable for use in the epoxy resin along with the epoxy resin containing oxazolidone. Examples of suitable epoxy resins may include the diglycidyl ethers of polyhydric phenol compounds such as resorcinol, catechol, hydroquinone, bisphenol, bisphenol A, bisphenol AP (1,1-bis(4-hydroxylphenyl)-1-phenyl ethane), bisphenol F, bisphenol K, bisphenol M, tetramethylbiphenol, diglycidyl ethers of aliphatic glycols and polyether glycols such as the diglycidyl ethers of $C_{1-24}$ alkylene glycols and poly(ethylene oxide) or poly(propylene oxide) glycols; polyglycidyl ethers of phenol-formaldehyde novolac resins, alkyl substituted phenol-formaldehyde resins (epoxy novalac resins), phenol-hydroxybenzaldehyde resins, cresol-hydroxybenzaldehyde resins, dicyclopentadiene-phenol resins and dicyclopentadiene-substituted phenol resins, and any combination thereof. Suitable diglycidyl ethers include diglycidyl ethers of bisphenol A resins such as are sold by Olin Corporation D.E.R.® 661 and 662 resins.

Commercially available diglycidyl ethers of polyglycols include those sold as D.E.R.® 732 and D.E.R.® 736 by Olin Corporation.

Epoxy novolac resins may also be used. Such resins are available commercially as D.E.N.® 354, D.E.N.® 431, D.E.N.® 438 and D.E.N.® 439 from Olin Corporation.

The amount of the solid epoxy resin may range from about 10 to 65 weight percent, and in particular, from about 15 to 55 weight percent, and more particularly, from about 20 to 45 weight percent based on the total weight of all epoxy resins in the epoxy resin composition. In a preferred embodiment, the amount of the solid epoxy resin in the epoxy resin composition is from 25 to 43 weight percent total weight of all epoxy resins in the epoxy resin composition.

The amount of the liquid epoxy components in the epoxy resin composition may range from about 35 to 90 weight percent, and in particular, from about 45 to 85 weight percent, and more particularly, from about 55 to 75 weight percent based on the total weight of all epoxy resins in the epoxy resin composition.

In particular embodiments, the liquid epoxy resin comprises a combination of an diglycidyl ethers epoxy resin (e.g., diglycidyl ether of bisphenol A) and an epoxy novolac resin. In one embodiment, the the diglycidyl ethers of bisphenol A epoxy resin is present in an amount 0 to 65 weight percent and an epoxy novolac resin that is present in an amount of from 0 to 70 weight percent total weight of all epoxy resins in the epoxy resin composition. Preferably, the diglycidyl ether resin is present in an amount 10 to 40 weight percent and the epoxy novolac resin is present in an amount of from 15 to 62 weight percent based on the total weight of all epoxy resins in the epoxy resin composition. In a preferred embodiment, the a diglycidyl ether liquid epoxy resin is present in an amount 15 to 30 weight percent and an epoxy novolac resin that is present in an amount of from 25 to 46 weight percent based on the total weight of all epoxy resins in the epoxy resin composition.

The epoxy resin composition also is comprised of an epoxy hardener such as those known in the art. The hardener causes the adhesive to cure (cross-link) when heated to a temperature of at least 80° C., preferably at least 100° C. or greater, but does not cause the adhesive to cure or the adhesive cures very slowly at room temperature (about 22° C.) or even at temperatures up to at least 50° C. Suitable hardeners include boron trichloride/amine and boron trifluoride/amine complexes, dicyandiamide, melamine, diallylmelamine, guanamines such as acetoguanamine and benzoguanamine, aminotriazoles such as 3-amino-1,2,4-triazole, hydrazides such as adipic dihydrazide, stearic dihydrazide, isophthalic dihydrazide, semicarbazide, cyanoacetamide, and aromatic polyamines such as diaminodiphenylsulphones. The use of dicyandiamide, isophthalic acid dihydrazide, adipic acid dihydrazide and 4,4'-diaminodiphenylsulphone is particularly preferred.

In a preferred embodiment the hardener is a micronized latent hardener such as dicyandiamide. Typically the micronized latent hardner has a particle distribution in which 98% of the particles have a maximum particle diameter that is less than 10 microns and where at least 35% of particles have a particle diameter that is less than 2 microns provides for a faster cure rate of the epoxy resin composition. As noted previously, fast cure rates are particularly desirable in automated applications where high throughput in the production of molded articles and parts is required.

Preferably, the latent hardener has a particle distribution in which 98% of the particles have a maximum particle diameter that is less than 6 microns, and more preferably, 98% of the particles have a maximum particle diameter that is less than 4 microns. Preferably, at least 45% of the particles having a diameter of less than 2 microns, and more preferably, at least 55% of the particles having a diameter of less than 2 microns, and even more at least 90% of the particles having a diameter of less than 2 microns. In a preferred embodiment, 100% of the particles have a diameter of less than 2 microns. The particle size can be measured with a laser diffraction system, such as the Beckman Colter LS 13-320 Laser Diffraction Particle Size Analyzer equipped with the Tornado Dry Powder System.

Examples of latent hardeners that may be used in embodiments of the present invention include dicyandiamide and guanamines, such as acetoguanamine and benzoguanamine. Preferably the latent hardener comprises dicyandiamide. A suitable dicyandiamide latent hardener that may be used in embodiments of the invention is available from Alzchem under the product name DYHARD® SF100.

Most commercially available dicyandiamide hardeners have particle distributions where the average particles sizes are well above 2 microns. For example, Alzchem's literature describes that the dicyandiamide available under the product name DYHARD® SF100 has a particle distribution in which 98% of the particles have a diameter between 5.2 and 5.8 microns. Thus, to provide a latent hardener having a desired particle size distribution it may be necessary to further process the hardener, for example, by milling or grinding, to produce a particle distribution in which at least 35% of particles have a particle diameter that is less than 2 microns.

The latent hardener in the epoxy resin composition is present in an amount that is sufficient to cure the epoxy resin. In one embodiment, the latent hardener is present in an amount relative to the total amount of epoxy resins in the composition corresponding to an epoxy/hardener equivalent ratio from 0.5 to 3 where the equivalent ratio is calculated by:

$$\frac{(m_{epoxy}/EEW)}{(m_{hardener}/HEW)}$$

where $m_{epoxy}$ is the mass of epoxy resin, EEW is equivalent weight per epoxy group of the epoxy component blend, $m_{hardener}$ is the mass of the hardener, and HEW is the equivalent weight per active hydrogen of the hardener blend. Preferably the epoxy/hardener equivalent ratio is 0.75 to 2, more preferably 0.9 to 1.1, and most preferably 1.

In terms of weight percent, the amount of latent hardener in the epoxy resin composition is typically between 5 and 15 weight percent based on the total weight of the epoxy resin composition, and more typically from about 6 to 12 weight percent. In a preferred embodiment, the amount of latent hardener in the epoxy resin composition is between 7 and 8 weight percent, based on the total weight of the epoxy resin composition.

The epoxy resin composition also includes a latent catalyst that is soluble in the epoxy resins of the composition. For a solubilized catalyst to be latent generally requires that the latency comes directly from the chemical structure of the catalyst. For example, such a latent catalyst may include a blocked catalyst where the actual catalytically active species is not present until generated by an unblocking reaction that occurs at high temperatures, which are typically used during molding of the prepreg.

As used herein, the term 'soluble" with respect to the latent catalyst requires that the catalyst be substantially dissolved in the epoxy resin composition prior to infusion of the epoxy resin composition into the fibrous material. Substantially dissolved means that greater than 90% of the catalyst, and preferably greater than 95%, and most preferably 100% of the catalyst is dissolved in the epoxy resin composition. Typically, it is desirable to dissolve the catalyst in the epoxy resin composition during mixing of the epoxy resin composition.

The amount of the latent catalyst in the epoxy resin composition is at a level of 1 to 7 parts per hundred parts epoxy resin (PHR of catalyst=100 ($m_{catalyst}/m_{epoxy}$), where $m_{catalyst}$ is the mass of the catalyst and $m_{epoxy}$ the mass of the epoxy resin. In a preferred embodiment, the latent catalyst is present in an amount from 2 to 6 PHR, and more preferably, from 3 to 5 PHR.

Examples of latent catalysts that may be used in embodiments of the present invention include substituted urea and/or modified imidazole (e.g., 2-phenyl-imidazole, 2,4-diamino-6-[2'-methylimidazolyl-(1')]-ethyl-s-triazine, 2,4-diamino-6-[2'-methyl imidazolyl-(1')]-ethyl-s-triazine isocyanuric acid adduct dehydrate). In a preferred embodiment, the soluble latent catalyst are blocked urea catalysts which are latent and which are soluble in the epoxy resin. An example of a suitable latent catalyst that may be used in embodiments of the present invention is toluene bis-dimethyl urea ("TBDMU").

Depending upon the end application, the epoxy resin composition may also include additional components, such as water, solvents, dispersants, inorganic fillers, tougheners, mold release agents, flow aids, additional additives for specific functionality, such as wetting agents and/or reactive diluents. In a preferred embodiment, the epoxy resin composition includes a mold release agent. An example of a suitable release agent is an ester of montanic acid, which is available from Clariant under the product name LICO-WAX® E. In a preferred embodiment, the tougheners may be any reactive polyurethane based toughener, core shell toughener or combination thereof such as those known in the art including, for example, core shell rubbers described in EP 1 632 533 A1 and reactive polyurethane rubbers described in EP-A-0 308 664 (page 5, line 14, to page 13, line 24), and in U.S. Pat. No. 5,278,257 (at column 2, lines 14 to 33 and column 4, line 19 and column 16, line 18), the disclosures of which are incorporated herein by reference. Exemplary core shell rubbers are available from Kaneka Kane Ace, including Kaneka Kane Ace MX core shell rubbers and in particular MX 153 and 154.

The epoxy resin and formation of the epoxy carbon fiber reinforced composite may be made by any suitable method in the art. Preferably the resin and composite are formed as described in the relevant portions of WO/2017/066056.

EXAMPLES

Comparative Example 1

12K A42 unsized carbon fiber (DowAksa, Yalova, Turkey) were used as received.

Example 1

A solution of hexamethylendiamine (20-25 millimolar concentration in 0.1 M sodium hydroxide) was prepared in a 120 mL glass vial. The sodium hydroxide solution used was prepared by mixing 1 volume units of 50% by weight NaOH solution (Sigma-Aldrich, Analytical grade) with 124 volume units of deionized water (>18 MΩ resistivity). Carbon fibers treated as in Comparative Example 1 were wrapped around a cylindrical plastic mesh and immersed into the amine solution, with one end of the carbon fiber tow left outside the jar. A cap with four ports (two 0.25" diameter, two 0.125" diameter) was screwed on the top of the glass vial to secure the carbon fiber. A graphite rod counter electrode (0.25" diameter), Ag/AgCl reference (¼" diameter, Bioanalytical Systems) and ⅛" nitrogen purge tubing (⅛" diameter) were inserted through the cap and into the amine solution. A slow flow of nitrogen was used to provide solution agitation during the experiment, but no attempt was made to remove oxygen prior to the electrochemical process. After connecting the electrodes to a potentiostat (Biologic VMP-3), the carbon fiber was electrochemically treated as follows: 10 s delay at open circuit potential, apply 5 mA current to the carbon fiber for 130 s. and then cycle 5 times from 0.0 to 0.6V vs. Ag/AgCl to evaluate double layer capacitance.

The fiber was then rinsed with deionized water before being immersed in excess (~150 mL) deionized water for approximately 5 minutes and hung over tubing to dry in a laboratory hood.

Example 2

Example 2 used the same procedure as Example 1 except that 2,2'-ethylenedioxy-bis(ethylamine) was used instead of hexamethylendiamine Comparative Example 2

The same fibers were used as in Example 1, but the electrolyte solution was (1) 0.5 M sodium hydroxide without any amine and (2) the voltage was applied to the carbon fibers as follows: 10 s delay at open circuit potential, sweep to 1.0V vs. Ag/AgCl at 50 mV/s, hold carbon fiber at 1.0V for 120 s and then Cycle 5 times from 0 to 1.0V to evaluate double-layer capacitance.

Comparative Example 3

The carbon fiber of Comparative Example 1 was used and electrochemically treated using the same procedure as Comparative Example 2 but with a solution of 10 millimolar hexamethylenediamine and 100 millimolar tetrabutylammonium hexafluorophosphate in N,N-dimethylformamide.

Comparative Example 4

The carbon fiber of Comparative Example 1 was used. The carbon fiber was further treated in the same solution as Example 1 except that no voltage was applied to the carbon fiber during the time in the solution.

Surface Characterization

X-ray photoelectron spectroscopy (XPS) was used to determine the effect of the electrochemical treatments. A PHI VersaProbe II XPS (Physical Electronics Inc.) was used without electron or ion gun neutralization. The analyzer mode was scanned mode. The analyzer pass energy and step size were 187.85 eV (survey spectra); 0.4 eV/step, 1 sweep, with a 200 ms dwell time and the high resolution spectra was performed at 46.5 eV, 0.125 eV/step with a 200 ms dwell time. The analysis area (16%-84% signal level) was 100 micromber dispersive×1400 micrometer non-dispersive. The number of analysis areas was 5 for each sample and the take off angle was 45 degrees.

Secondary Ion Mass Spectroscopy (SIMS) was also used to determine the effect of the electrochemical treatments. A IonToF IV SIMS (IONTOF GmbH) was used employing a $Bi_3^+$ ion source, analysis ion energy of 25 keV, analysis pulse repetition rate of 150 microseconds, raster size/type of 150 micrometers/random, sprectra collection time of 50 scans, primary ion mode of bunched, and charge compensation on. The software used was Surface Lab 6.5.69783 software.

When performing potential sweeps of the above Examples and Comparative Example 2, it was found that for Examples 1 and 2 the current was higher at all voltages indicating improved rate of surface treatment of the carbon fiber in Examples 1 and 2. This may be due to the synergistic oxidation of the carbon fiber and amine at the surface of the carbon fiber.

The evaluation of the Examples and Comparative Examples also show that both Examples 1 and 2 have a significantly lower capacitance indicating a substantially different ionic double layer (i.e., chemistry than Comparative Example 1).

The XPS results for the Examples and Comparative Examples are shown in Table 1. From the results, it is clear that Example 1 shows the formation of nitrogen species on the surface of the carbon fibers compared to all of the Comparative Examples other than Comparative Example 3, which uses dimethylformamide (DMF) instead of water. This result clearly shows the effectiveness of the present invention's method utilizing water too quickly and effectively realize a carbon surface having amino species without the problems associated with using an organic liquid as the electrolyte. Likewise, the SIMs results also show the same result for Example 1 compared to Comparative Example 2, with the presence of amino species being at least one order of magnitude greater for Example 1 compared to Comparative Example 2.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims, which even though may not depend directly from each and every other, it is understood that any all combinations are contemplated. Although specific terms are employed herein, they are used in a generic and descriptive sense only and not for purposes of limitation.

TABLE 1

| Example | N/C (%) | O/C (%) |
|---|---|---|
| Example 1 | 5.9 ± 1.3 | 9.6 ± 0.5 |
| Comparative Example 1 | 3.7 ± 0.1 | 10.0 ± 0.3 |
| Comparative Example 2 | 3.3 ± 0.4 | 7.1 ± 0.6 |
| Comparative Example 3 | 6.5 ± 0.9 | 8.4 ± 0.6 |
| Comparative Example 4 | 3.6 ± 0.3 | 6.9 ± 0.3 |

The invention claimed is:

1. A method of treating the surface a carbon fiber comprising;
   (i) contacting a carbon fiber surface with an aqueous solution comprised of a non-cyclic aliphatic amine and water soluble inorganic hydroxide and said aqueous solution having a pH of at least 9, and
   (ii) applying a positive electrical bias to the carbon fibers in the aqueous solution relative to another electrode in contact with the aqueous solution, wherein the positive electrical bias is at a voltage above the oxidation potential of water.

2. The method of claim 1, wherein the pH is at least 11.

3. The method of claim 1, wherein the non-cyclic aliphatic amine is represented by:

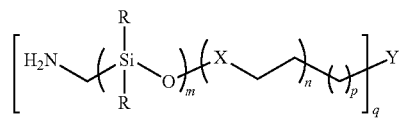

wherein X is C, N, or O, Y is C or N, m is 0 to 200, n is 0 to 200, p is 0 to 10 and q is 1 to 3.

4. The method of claim 3, wherein the non-cyclic aliphatic amine is selected from the group consisting of hexamethylenediamine, 2,2'ethylenedioxy-bis(ethylamine), diethylenetriamine, triethylenetetramine, and combination thereof.

5. The method of claim 1, wherein the voltage is at least 0.6 V to about 1.2 V relative to a saturated Ag/AgCl reference electrode.

6. The method of claim 1, wherein the non-cyclic aliphatic amine is present in the aqueous solution at a concentration of 0.1 millimolar to 100 millimolar.

7. The method of claim 6, wherein the concentration of the non-cyclic aliphatic amine is from 10 to 30 millimolar.

8. The method of claim 1, wherein water soluble inorganic hydroxide is potassium hydroxide, sodium hydroxide or combination thereof.

9. The method of claim 1, wherein the water soluble inorganic hydroxide is present in the aqueous solution at a concentration of 10 millimolar to 1000 millimolar.

10. The method of claim 9, wherein the concentration of the water soluble inorganic hydroxide is 50 to 150 millimolar.

11. The method of claim 1, wherein the applying of the positive electrical bias is performed at a constant current.

12. The method of claim 10, wherein the current is from 1 to 100 milliamps per gram of carbon fiber.

13. The method of claim 12, wherein the method is performed for a residence time in the aqueous solution from 1 second to 200 seconds.

14. A carbon fiber treated by the method of claim 1.

15. An epoxy fiber reinforced composite comprising a cured epoxy resin matrix having therein carbon fibers of claim 14, wherein the carbon fibers comprise greater than 50% by volume of said composite.

* * * * *